(12) United States Patent
Iozzo et al.

(10) Patent No.: US 11,186,147 B2
(45) Date of Patent: Nov. 30, 2021

(54) VEHICLE DOOR ASSEMBLY

(71) Applicant: Nissan North America, Inc., Franklin, TN (US)

(72) Inventors: David Iozzo, West Bloomfield, MI (US); David Kovie, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 255 days.

(21) Appl. No.: 16/436,645

(22) Filed: Jun. 10, 2019

(65) Prior Publication Data

US 2020/0384834 A1 Dec. 10, 2020

(51) Int. Cl.
*B60J 5/00* (2006.01)
*B60J 5/04* (2006.01)
*E05F 11/38* (2006.01)

(52) U.S. Cl.
CPC ............. *B60J 5/0463* (2013.01); *B60J 5/042* (2013.01); *B60J 5/0469* (2013.01); *E05F 11/382* (2013.01); *E05Y 2900/55* (2013.01)

(58) Field of Classification Search
CPC ........ B60J 5/0463; B60J 5/042; B60J 5/0469; B60J 5/0426; E05F 11/382; E05F 11/40; E05F 11/52; E05Y 2900/55
USPC .......................................... 49/502; 296/146.6
See application file for complete search history.

(56) References Cited

U.S. PATENT DOCUMENTS

| | | | |
|---|---|---|---|
| 7,500,712 B2 | 3/2009 | Hirooka et al. | |
| 2006/0152035 A1 | 7/2006 | Baker et al. | |
| 2010/0148535 A1 * | 6/2010 | Takahashi | B60J 5/0429 296/187.12 |
| 2014/0239668 A1 | 8/2014 | Ohsawa et al. | |
| 2014/0284961 A1 | 9/2014 | Otake et al. | |
| 2014/0319869 A1 | 10/2014 | Baskar et al. | |
| 2017/0036521 A1 * | 2/2017 | Ogawa | B62D 29/04 |
| 2017/0240029 A1 * | 8/2017 | Moriyama | B60J 5/0433 |
| 2017/0240031 A1 * | 8/2017 | Moriyama | B60J 5/0466 |
| 2017/0282695 A1 * | 10/2017 | Resch | B62D 29/008 |
| 2017/0326954 A1 | 11/2017 | Peidro Aparici | |

(Continued)

FOREIGN PATENT DOCUMENTS

| | | | | |
|---|---|---|---|---|
| EP | 1468855 A2 | 10/2004 | | |
| EP | 1564050 A1 * | 8/2005 | ............ | B60J 5/0444 |
| EP | 2522536 A1 | 11/2012 | | |

(Continued)

*Primary Examiner* — Jerry E Redman
(74) *Attorney, Agent, or Firm* — Global IP Counselors, LLP (57) ABSTRACT

A vehicle door assembly with an inner door panel, an outer door panel and a reinforcement assembly. A first attachment area is defined adjacent to an upper edge and a forward edge and a second attachment area is defined adjacent to the upper edge and a rearward edge of the inner door panel. The inner door panel and the outer door panel are fixedly attached to one another and define a hollow space therebetween. The reinforcement assembly has a first end fixedly attached to the first attachment area of the inner door panel and a second end fixedly attached to the second attachment area of the inner door panel. A mid-section extends of the reinforcement assembly extends along the upper edge of the outer door panel. The mid-section of the reinforcement assembly and the upper edge of the inner door panel define a window receiving slot therebetween.

20 Claims, 7 Drawing Sheets

(56) References Cited

U.S. PATENT DOCUMENTS

2018/0072141 A1* 3/2018 Shimoda ................ B62D 25/02
2019/0299757 A1* 10/2019 Tomeki .................. B60J 5/0411

FOREIGN PATENT DOCUMENTS

EP          3025888 A1 *  6/2016   ............ B60J 5/0426
JP       2013-173481 A     9/2013

* cited by examiner

VEHICLE DOOR ASSEMBLY

BACKGROUND

Field of the Invention

The present invention generally relates to a vehicle door assembly. More specifically, the present invention relates to a vehicle door assembly that includes a reinforcement assembly that is fixed to an inner door panel of the vehicle door assembly and extends outboard of a window track and a window slot that receives the window track. Background Information Vehicles are constantly being modified and redesigned to improve response to impact event tests.

SUMMARY

One object is to provide a door assembly with a reinforcement assembly that is fixed to the inner door panel and extends outboard of a window track.

In view of the state of the known technology, one aspect of the present disclosure is to provide a vehicle door assembly with an inner door panel, an outer door panel and a reinforcement assembly. The inner door panel has a forward edge, a rearward edge, a lower edge and an upper edge. The inner door panel has a first attachment area adjacent to the upper edge and the forward edge and a second attachment area adjacent to the upper edge and the rearward edge. The outer door panel is fixedly attached to the forward edge, the rearward edge and the lower edge of the inner door panel. The inner door panel and the outer door panel define a hollow space therebetween. The upper edge of the inner door panel and an upper edge of the outer door panel are spaced apart from one another. The reinforcement assembly has a first end, a mid-section and a second end. The first end is fixedly attached to the first attachment area of the inner door panel. The second end is fixedly attached to the second attachment area of the inner door panel. The mid-section extends along the upper edge of the outer door panel. The mid-section of the reinforcement assembly and the upper edge of the inner door panel define a window receiving slot therebetween.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
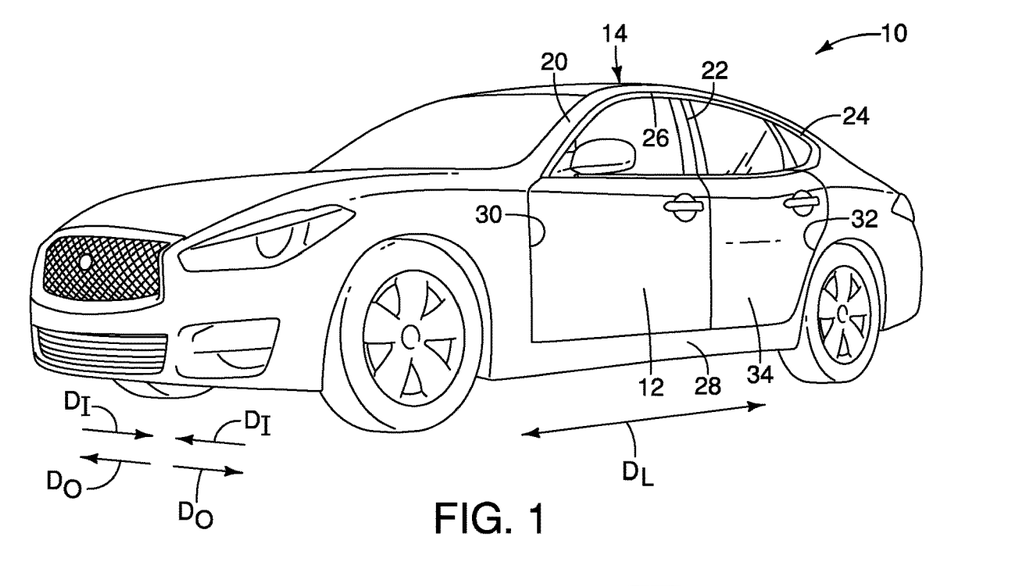
FIG. 1 is a perspective view of a vehicle that includes door assembly in accordance with an exemplary embodiment.

Referring initially to FIG. 1, a vehicle 10 having a door assembly 12 is illustrated in accordance with a first embodiment.

The vehicle 10 has a vehicle body structure 14 that defines a plurality of different directions that are referred to in the following description. Specifically, as shown in FIG. 1, the vehicle body structure 14 defines vehicle inboard directions $D_I$, vehicle outboard directions $D_O$ and a vehicle longitudinal direction $D_L$. The vehicle longitudinal direction $D_L$ is defined as a direction relative to the length of the vehicle 10 or directions parallel to the length of the vehicle 10 (front to back and/or back to front). The vehicle inboard directions $D_I$ are defined as directions heading toward the center of the vehicle 10 from laterally outboard locations. The vehicle outboard directions $D_O$ are defined as directions heading laterally outboard and away from the center of the vehicle 10.

As shown in FIG. 1, the vehicle body structure 14 includes at least an A-pillar 20, a B-pillar 22, a C-pillar 24, a roof rail 26 and a sill structure 28. The A-pillar 20, the B-pillar 22, a forward section of the roof rail 26 and a forward section of the sill structure 28 together surround and define a front door opening 30. The B-pillar 22, the C-pillar 24, a rearward section of the roof rail 26 and a rearward section of the sill structure 28 together surround and define a rear door opening 32. A rear door 34 is installed to the B-pillar 22 to move between a closed orientation (shown in FIG. 1) and an open orientation (not shown).

Figure 2:
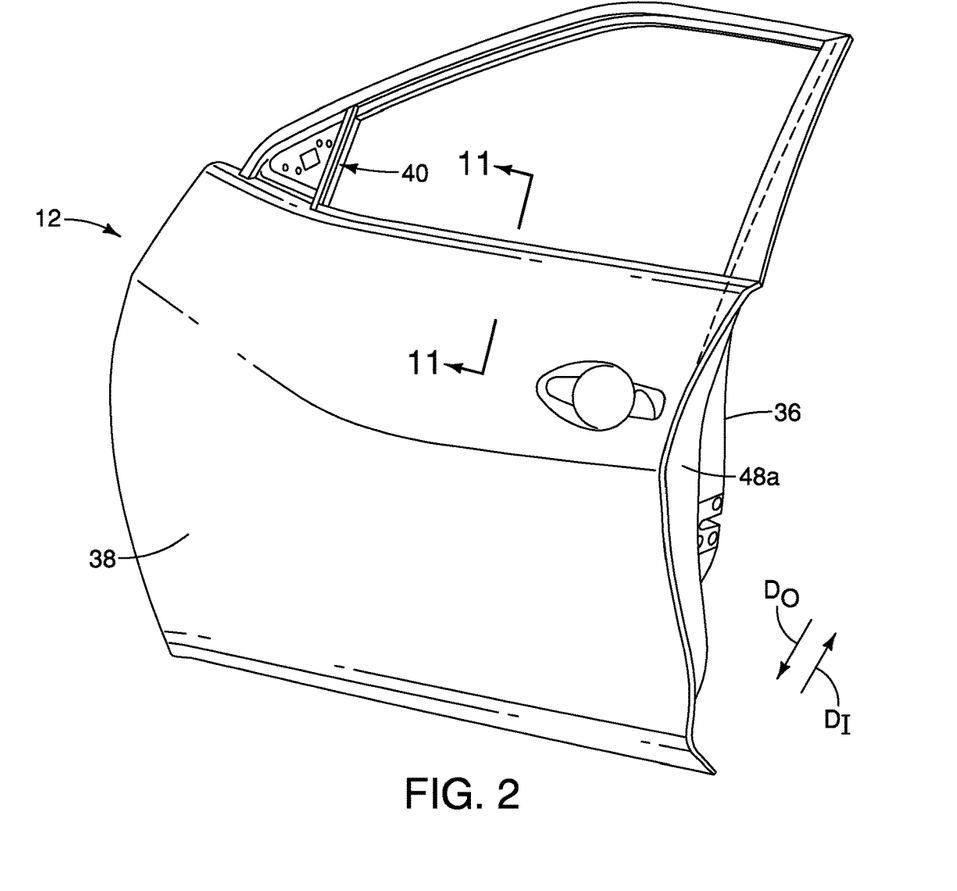
FIG. 2 is a perspective view of the door assembly shown removed from the vehicle in accordance with the exemplary embodiment.

As shown removed from the vehicle 10 in FIG. 2, the vehicle includes the door assembly 12 (also referred to as the front door assembly 12). The front door assembly 12 is pivotally installed to the A-pillar 20 of the vehicle body structure 14 via hinges (not shown), in a conventional manner, such that the front door assembly 12 covers the front door opening 30 in a closed orientation, as shown in FIG. 1, and exposes the passenger compartment of the vehicle 10 in an open orientation (not shown). In the closed orientation, the front door assembly 12 spans the front door opening 30 from the A-pillar 20 to the B-pillar 22.

Figure 3:
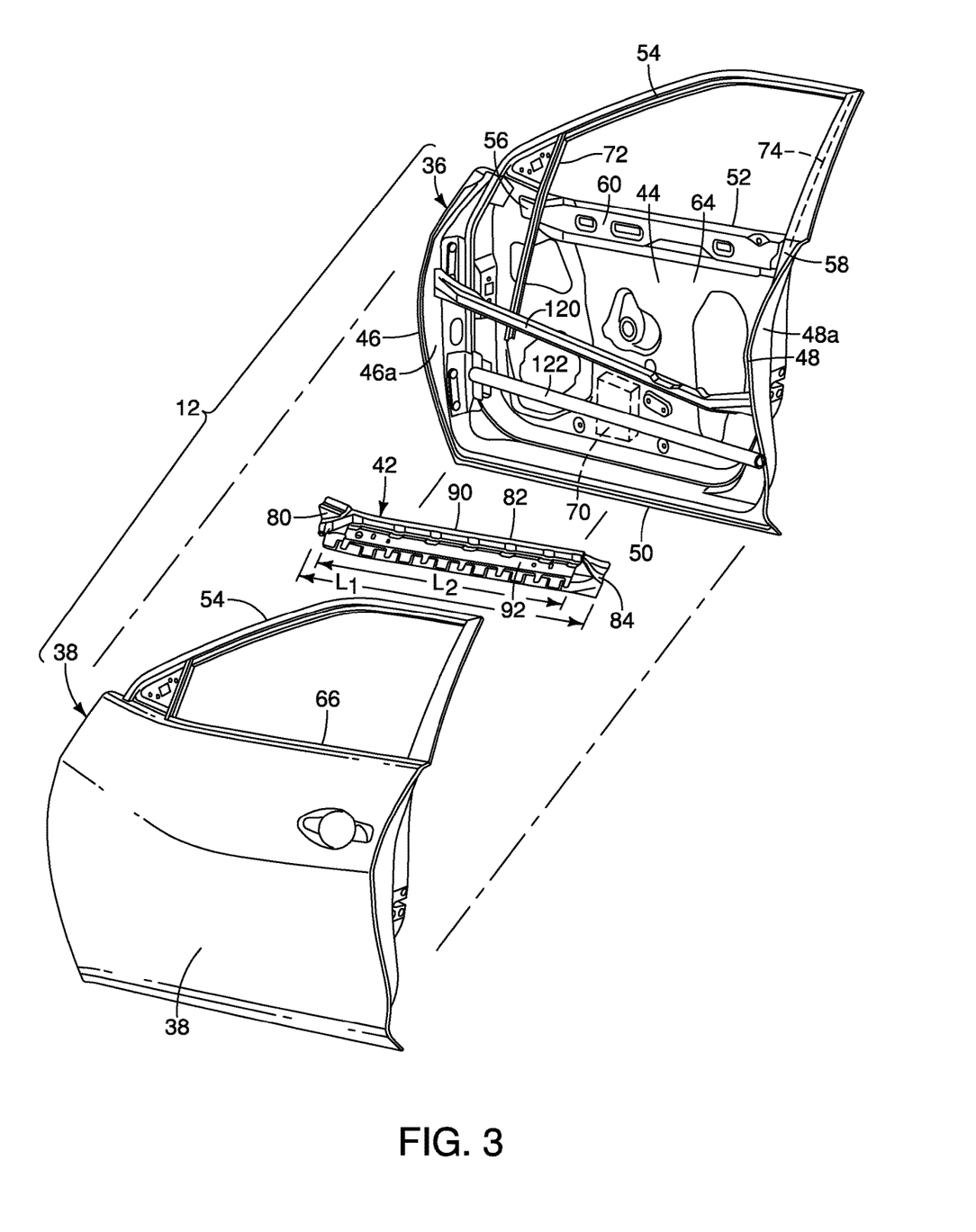
FIG. 3 is a perspective exploded view of the door assembly removed from the vehicle showing an inner door panel, a reinforcement assembly and an outer door panel in accordance with the exemplary embodiment.
Figure 4:
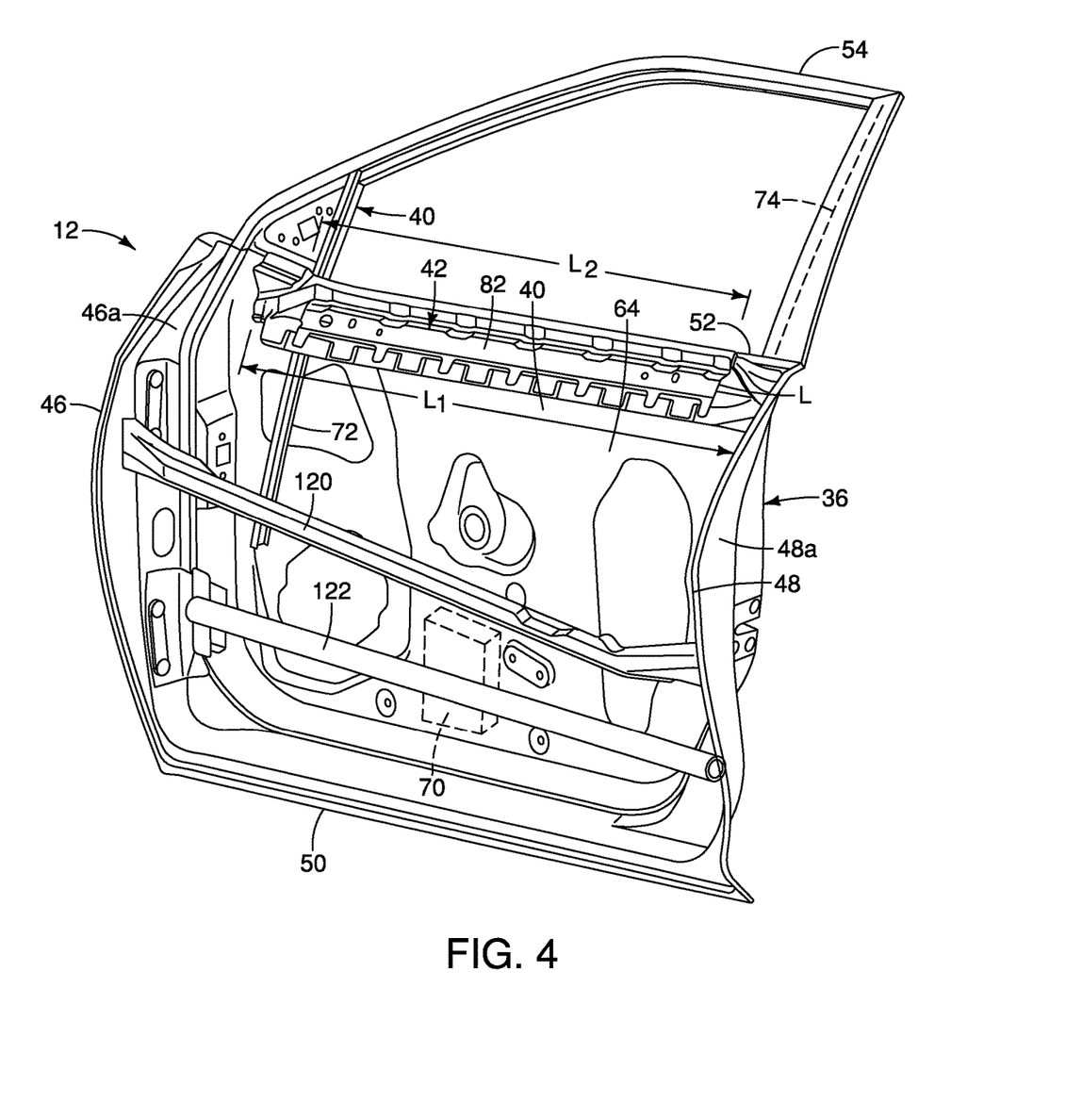
FIG. 4 is a perspective view of the inner door panel with the reinforcement assembly installed thereto in accordance with the exemplary embodiment.

As shown in FIGS. 2, 3 and 4, the door assembly 12 basically includes an inner door panel 36, an outer door panel 38, a window positioning assembly 40 and a reinforcement assembly 42.

The inner door panel 36 is made of a medium strength sheet metal material in a conventional manner. The inner door panel 36 includes a main body 44, a forward edge 46, a rearward edge 48, a lower edge 50, an upper edge 52 and a window frame structure 54. The forward edge 46 and rearward edge 48 are defined on flanges that extend in the outboard direction $D_O$ from the main body 44. The inner door panel 36 also includes a first attachment area 56 and a second attachment area 58. The first attachment area 56 is located on the main body 44 adjacent to the upper edge 52 and the forward edge 46, and, the second attachment area 56 is located on the main body 44 adjacent to the upper edge 52 and the rearward edge 48.

The main body 44 of the inner door panel 36 also includes a stiffening member 60 fixedly attached to the inner door panel 36 along the upper edge 52. As is further described below, the reinforcement assembly 42 is attached to the first attachment area 56 and the second attachment area 58. As shown in FIGS. 9, 10, 12 and 13, the reinforcement assembly 42 and the stiffening member 60 define a window slot 62 therebetween. The stiffening member 60 is welded to the inner door panel 36 along the upper edge 52 via a weld $W_1$, as shown in FIG. 11. A lower end of the stiffening member 60 is further welded to the inner door panel 36 via the weld $W_2$, as shown in FIG. 11.

The outer door panel 38 is basically a contoured and shaped metallic panel that is shaped to conform to the overall shape and design of the vehicle 10. The outer door panel 38, like the inner door panel 36, is made in a conventional manner of medium strength sheet metal. The outer door panel 38 is attached to the forward edge 46, the rearward edge 48 and the lower edge 50 of the inner door panel 36. The inner door panel 36 and the outer door panel 38 define a hollow space 64 therebetween. The upper edge 52 of the inner door panel 36 and an upper edge 66 of the outer door panel 38 are spaced apart from one another, and together with the reinforcement assembly 42 and the stiffening member 60 define the window slot 62.

The window regulator assembly 40 includes a positioning mechanism 70 and window tracks 72 and 74. A glass window (not shown) slides up and down the parallel tracks 72 and 74. The tracks 72 and 74 have upper portions that are mounted to the window frame structure 54 and lower portions that extend into the hollow space 64. Portions of the tracks 72 and 74 are shown in FIGS. 3, 4, 9-11 and 13. The positioning mechanism 70 is installed to the inner door panel 36 within the hollow space 64, as shown in phantom in FIG. 4. The window tracks 72 and 74 basically extend from the positioning mechanism 70 within the hollow space 64 upward through the window receiving slot 62 to an area confined between portions of the window frame structure 54 and above the upper edge 52 of the inner door panel 36. The positioning mechanism 70 is connected to window glass (not shown) that is retained between the window tracks 72 and 74 for guided vertical movement therebetween, the positioning mechanism being operable to selectively raise and lower the window glass. Since window regulator assemblies, positioning mechanisms and window tracks are conventional vehicle components, further description is omitted for the sake of brevity.

Figure 12:
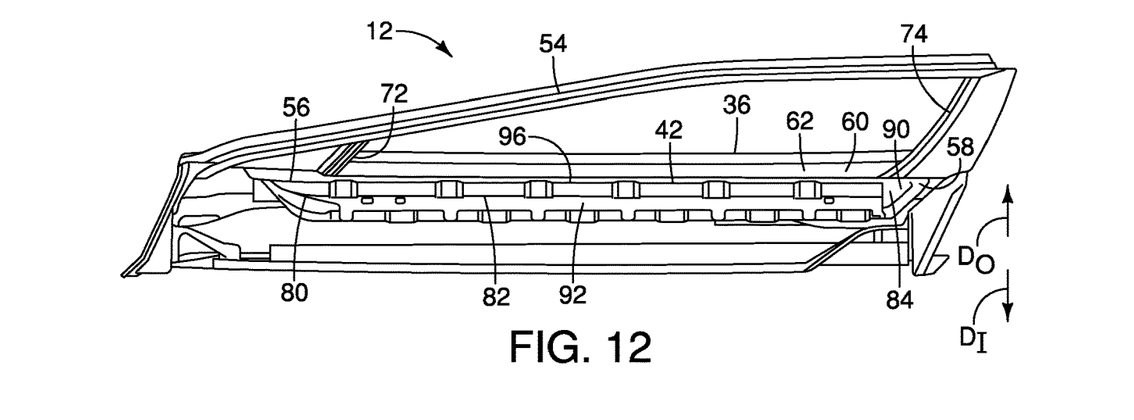
FIG. 12 is a top view of the door assembly with the outer door panel removed in accordance with the exemplary embodiment.

As shown in FIGS. 3 and 5-7, the reinforcement assembly 42 has a first end 80, a mid-section 82 and a second end 84. The first end 80 fixedly attached to the first attachment area 56 of the inner door panel 36. The second end 82 is fixedly attached to the second attachment area 58 of the inner door panel 36. As shown in FIG. 12, the mid-section 82 extends along the upper edge 66 of the outer door panel 38 and is attached to the outer door panel 38. Consequently, the mid-section 82 of the reinforcement assembly 42 and the upper edge 52 of the inner door panel 36 define a window receiving slot 62 therebetween.

As shown in FIGS. 5-7, 8 and 12, the reinforcement assembly 42 includes a first member 90 and a second member 92 with a hollow interior 94 defined therebetween. Both the first member 90 and the second member 92 of the reinforcement assembly 42 are made of a high strength steel that has greater tensile strength than either of the inner door panel 36 and the outer door panel 38. Together, the first member 90 and the second member 92 fixed together to form the reinforcement assembly 42 provide resistance to deformation of the door assembly 12 in response to an impact event.

The first member 90 of the reinforcement assembly 42 extends from the first attachment area 56 to the second attachment area 58. Further, the first end 80 and the second end 84 of the reinforcement assembly 42 are defined at opposite ends of the first member 90. The second member 92 of the reinforcement assembly 42 extends from the first attachment area 56 to the second attachment area 58 when attached to the inner door panel 36. However, the second member 92 do not necessarily overlay the first attachment area 56 and the second attachment area 58 and can end adjacent to the first attachment area 56 and the second attachment area 58. As shown in FIGS. 3-6, the first member 90 has a first length $L_1$. As shown in FIGS. 3-5 and 7, the second member 92 has a second length $L_1$. The first length $L_1$ is greater than the second length $L_2$.

Figure 5:
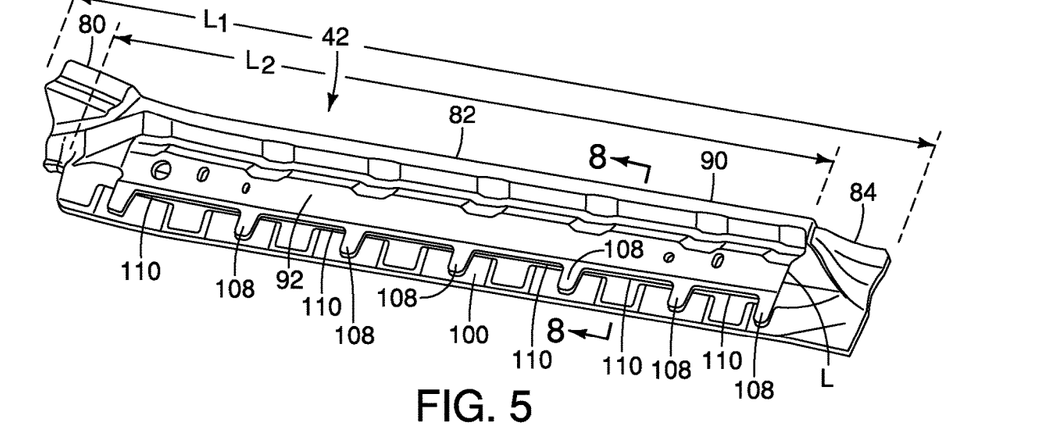
FIG. 5 is a perspective view of the reinforcement assembly shown removed from the inner door panel showing a first member and a second member fixed to one another in accordance with the exemplary embodiment.
Figure 6:
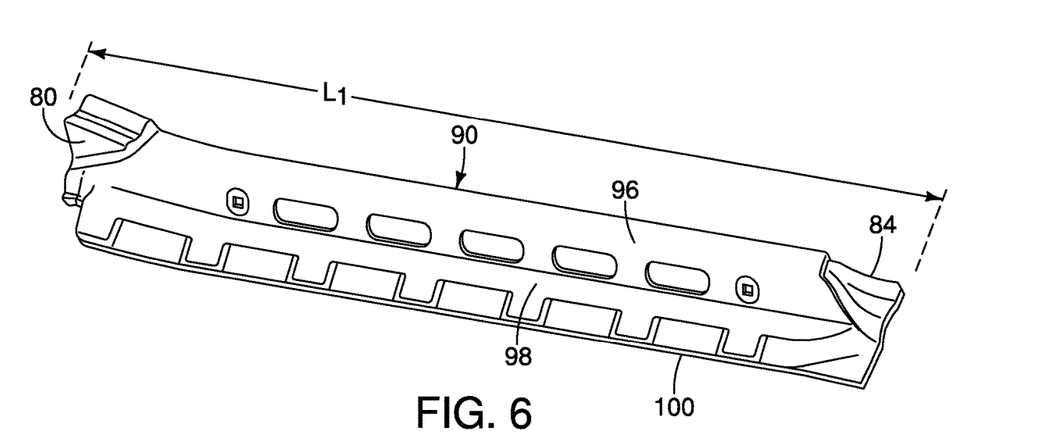
FIG. 6 is a perspective view of the first member of the reinforcement assembly with the second member removed in accordance with the exemplary embodiment.

As shown in FIG. 6, the first member 90 includes the first end 80, the second end 84, an upper flange 96, an offset section 98 and a lower flange 100. As shown in FIG. 4, the first end 80 is fixedly attached to the first attachment area 56, and, the second end 84 is fixedly attached to the second attachment area 58. Preferably, the first end 80 is welded to the first attachment area 56, and, the second end 84 is welded to the second attachment area 58. In the depicted embodiment, the second member 92 overlays at least a portion of the first end 80 of the first member 90 and the first attachment area 56. The second member 92 extends toward the second attachment area 58 to a location L (FIGS. 4 and 5). The second member 92, having a length shorter than the first member does not overlay the second end 82 of the first member 90 and does not overlay the second attachment area 56.

Figure 7:
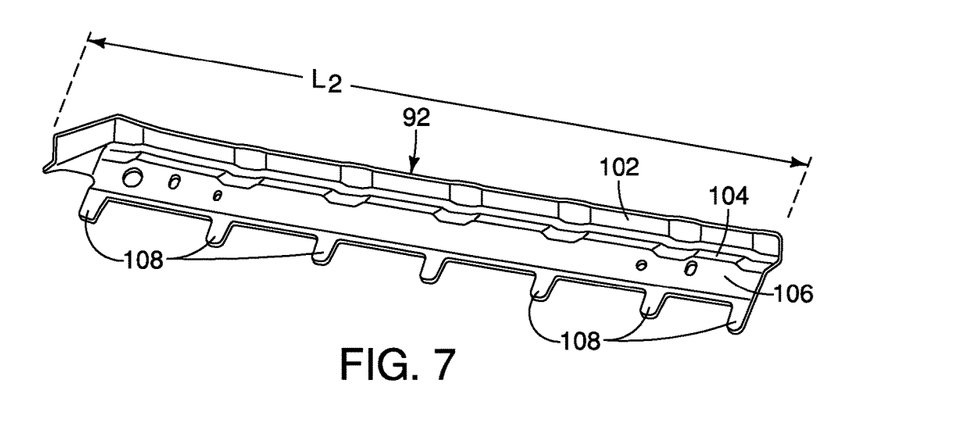
FIG. 7 is a perspective view of the second member of the reinforcement assembly removed from the first member in accordance with the exemplary embodiment.

As shown in FIG. 7, the second member 92 includes an upper flange 102, a first offset section 104, a second offset section 106, and a plurality of downwardly extending flanges 108.

Figure 8:
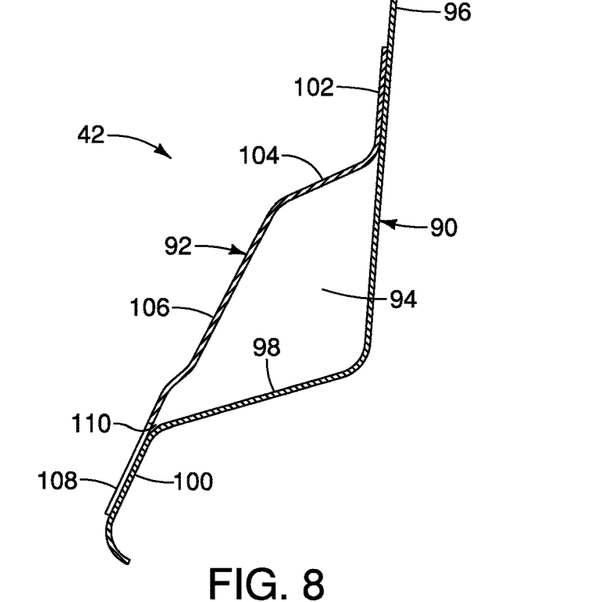
FIG. 8 is a cross-sectional view of the reinforcement assembly taken along the line 8-8 in FIG. 5, showing the first member and the second member fixed to one another in accordance with the exemplary embodiment.

As shown in FIGS. 5 and 8, the upper flange 96 of the first member 96 is fixedly attached to the upper flange 102 of the second member 92. As is also shown in FIGS. 5 and 8, the plurality of downwardly extending flanges 108 of the second member 92 are fixedly attached to the lower flange 100 of the first member 90. In the depicted embodiment, the upper flange 96 of the first member 90 welded via weld $W_4$ to the upper flange 102 of the second member 92, as shown in FIG. 11. Alternatively, mechanical fasteners can be used to fix the upper flange 96 to the upper flange 102. In the depicted embodiment, the plurality of downwardly extending flanges 108 of the second member 92 are welded via welds $W_3$ to the lower flange 100 of the first member 90, as shown in FIG. 11. Alternatively, mechanical fasteners can be used to fix the plurality of downwardly extending flanges 108 to the lower flange 100 of the first member 90.

As shown in FIGS. 8-12, the upper flange 96 of the first member 90 extends downward below the upper flange 102 of the second member 92. As shown in FIG. 11, the offset section 98 extends approximately horizontally in the outboard direction $D_I$ from a lower end of the upper flange 96 of the first member 90 toward the plurality of downwardly extending flanges 108 of the second member 92. The offset section 98 the upper flange 96 define an obtuse angle therebetween that is between 95 and 120 degrees. Further, the first offset section 104 of the second member 92 extends in the outboard direction $D_I$ from the upper flange 102 to the second offset section 106. The first offset section 104 is inclined slightly downward going toward the outboard direction $D_I$. The second offset section 106 extends downward in the outboard direction $D_I$ from the first offset section 104 and extends to the plurality of downwardly extending flanges 108 of the second member 92. The second offset section 106 defines an angle of inclination relative to horizontal that is greater than an angle of inclination defined by the first offset section 104 and horizontal. In other words, the second offset section 106 is more inclined relative to horizontal than the first offset section 104.

As shown in FIGS. 8-11, the hollow interior 94 between the first member 90 and the second member 92 is surrounded, as viewed in cross-section, by a lower section of the upper flange 96 of the first member 90, the offset section 98 of the first member 90, the first offset section 104 of the second member 92 and the second offset section 106 the second member 92. Further, the upper end of the upper flange 96 is welded via the weld $W_5$ to the upper edge 52 of the outer door panel 38.

Figure 9:
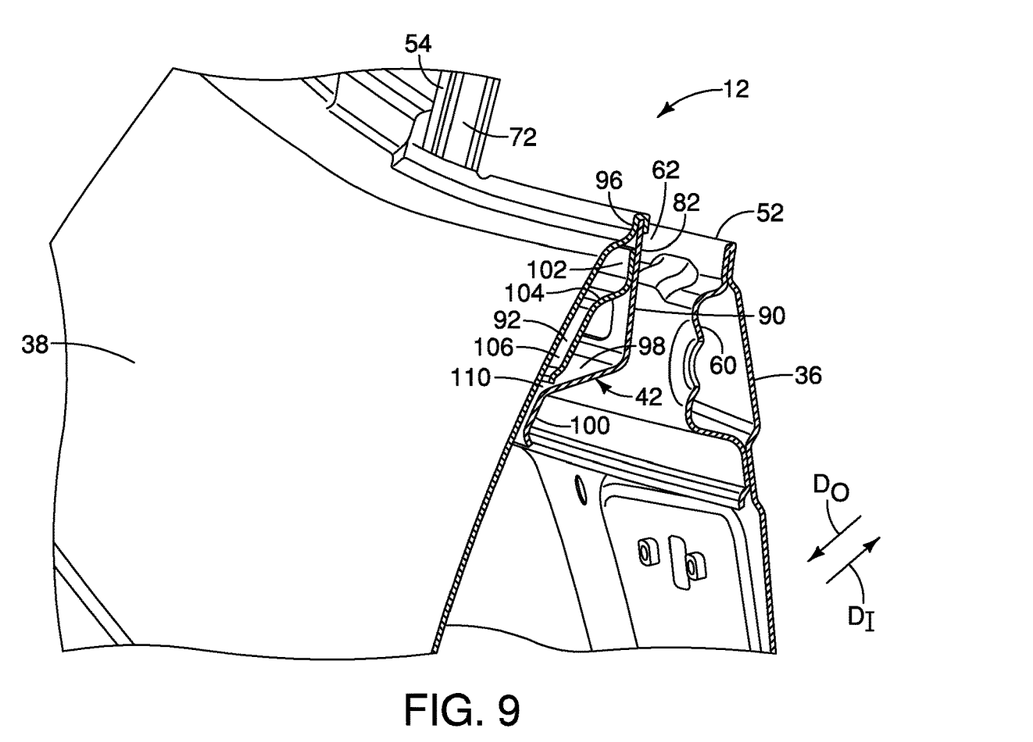
FIG. 9 is a perspective cross-sectional view of the door assembly showing details of the outer door panel, the reinforcement assembly and the inner door panel in accordance with the exemplary embodiment.
Figure 10:
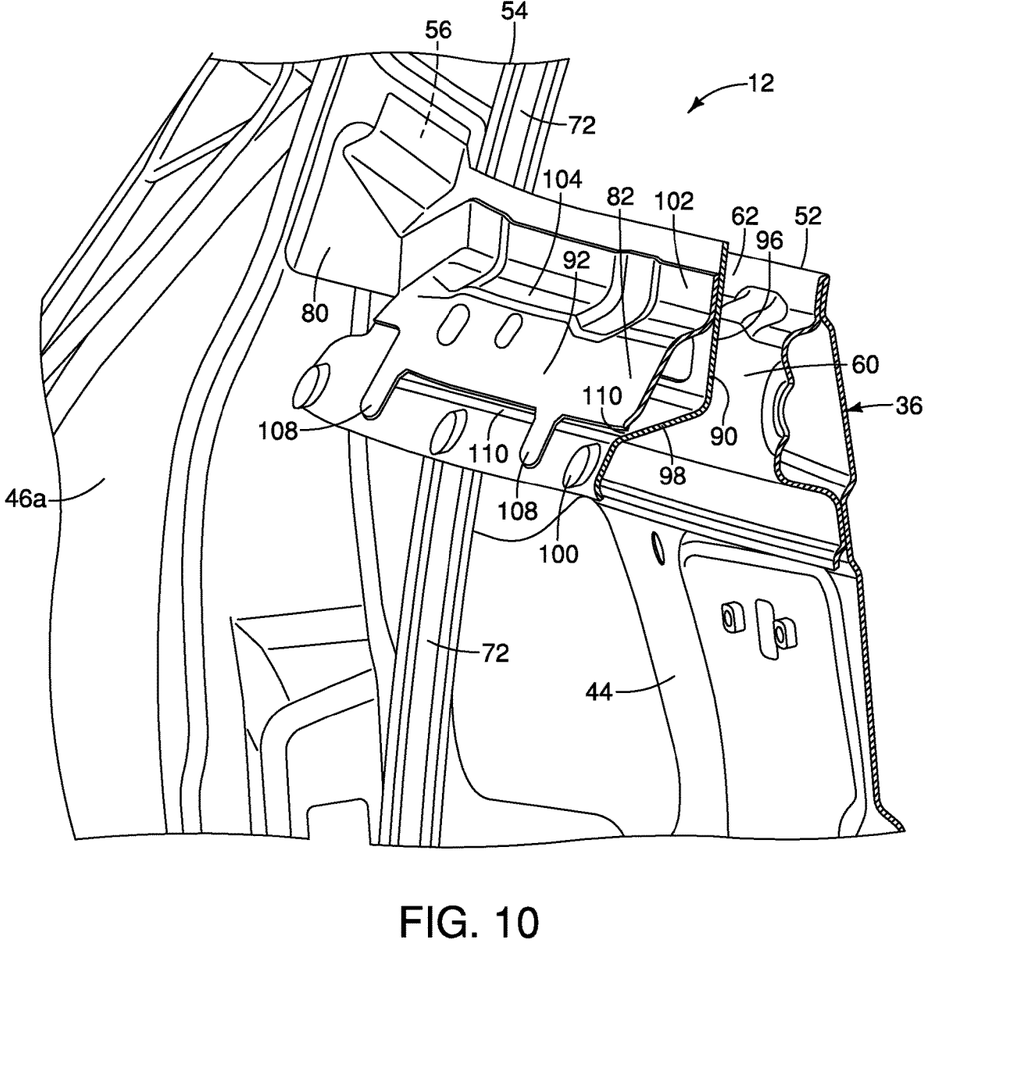
FIG. 10 is another perspective cross-sectional view of the door assembly showing details of the reinforcement assembly and the inner door panel with the outer door panel removed in accordance with the exemplary embodiment.
Figure 11:
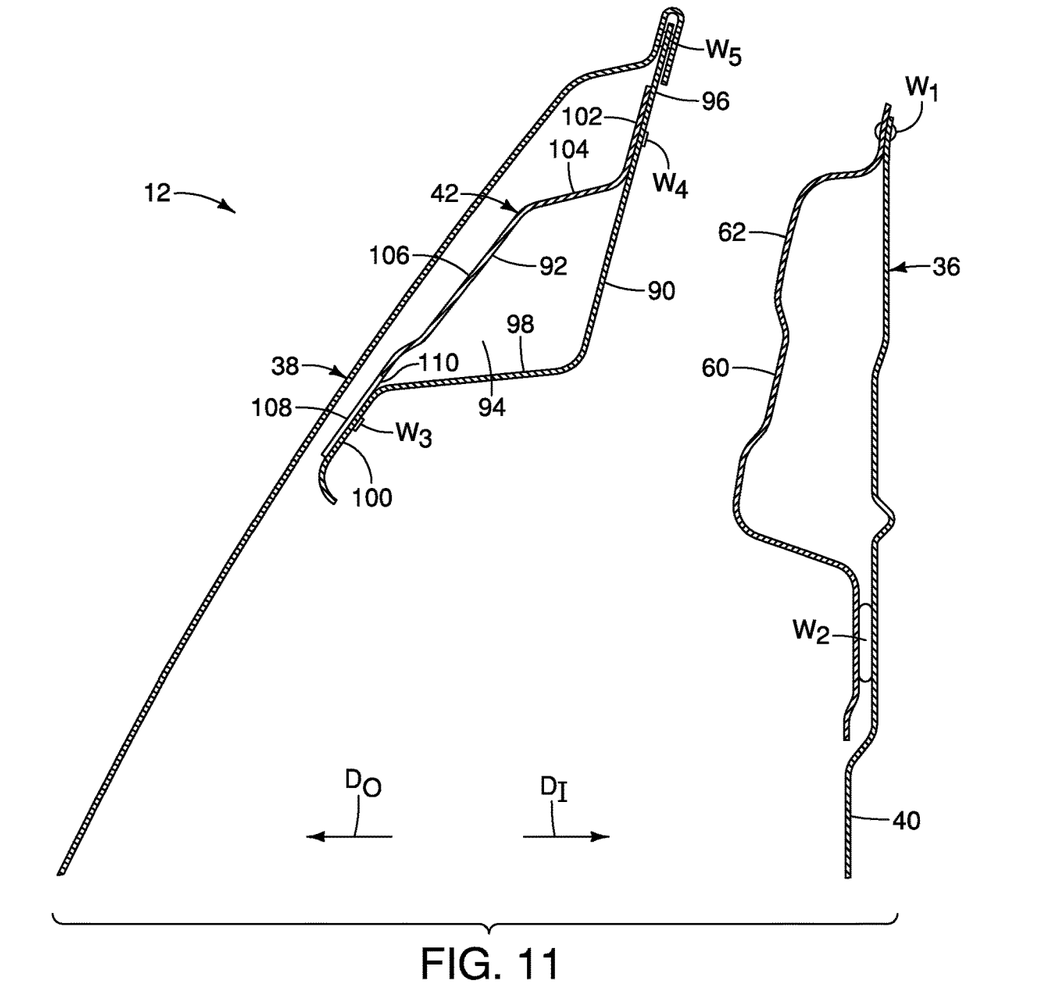
FIG. 11 is a cross-sectional view of the door assembly taken along the line 11-11 in FIG. 2, showing details of the outer panel, the reinforcement assembly and the inner door panel in accordance with the exemplary embodiment.

As shown in FIGS. 5, 9 and 10, a plurality of drainage openings 110 are defined between adjacent pairs of the plurality of downwardly extending flanges 108 and the offset section 98 of the first member 90. More specifically, the drainage openings 110 are defined above the lower flange 100 of first member 90 and below the second offset section 106. As shown in FIG. 10, the lower flange 100 of first member 90 and the second offset section 106 do not contact one another. The plurality of downwardly extending flanges 108 extend downward from the second offset section 106 of the second member 92 rigidly fixing the second member 92 to the first member 90. The plurality of downwardly extending flanges 108 are fixed to the lower flange 100 of the first member 90 at respective locations such that the plurality of drainage openings 110 are defined. The plurality of drainage openings 110 are advantageous in that, should rain or moisture in general, make its way into the hollow interior 94 of the reinforcement assembly 42, the water or moisture can drain out through the plurality of drainage openings 110 between adjacent pairs of the plurality of downwardly extending flanges 108.

As shown in FIG. 11, the lower flange 100 of the first member 90 is located outboard of the upper flange 96 of the first member 90 and outboard of the upper flange 102 of the second member 92.

As shown in FIGS. 9-12, the mid-section 82 of the reinforcement assembly 42 is located outboard of the stiffening member 60 and the upper edge 52 of the inner door panel 36. The window slot 62 is defined between the mid-section 82 of the reinforcement assembly 42 and the stiffening member 60 and the upper edge 52 of the inner door panel 36. The window tracks 72 and 74 are located at forward and rearward ends of the window slot 62 such that window glass (not shown) can freely move from an open position (with the window glass in a downward location within the hollow space 64 between the inner door panel 36 and the outer door panel 38) to a closed position (with the window glass moved to an upward position between upper sections of the window tracks 72 and 74 within the window frame structure 54).

Hence, the mid-section 82 of the reinforcement assembly 42 is located outboard of the window tracks 72 and 74, and, outboard of the window glass (not shown) in the area around the window slot 62.

During an impact event where the vehicle 10 receives impact forces to the outer door panel 38, the reinforcement assembly 42 absorbs a portion of the impact forces thereby reducing the impact forces that would otherwise be applied to the window glass (not shown) and the inner door panel 38.

The reinforcement assembly 42 further provides resistance to deformation of the door assembly 12 during an impact event in the area of the window slot 62.

The reinforcement assembly 42 includes the first member 90 and the second member 92 that define the hollow interior 94 therebetween. The offset section 98 of the first member 90 and the first and second offset sections 104 and 106 of the second member 92 basically make the reinforcement assembly 42 a hollow beam that provides rigidity and resistance to deformation during an impact event, as compared to a single member located along the window slot 62.

The first member 90 and the second member 92 of the reinforcement assembly 42 can be made of any of a variety of materials. For example, the first member 90 and the second member 92 can be formed of medium grade sheet metal, similar to the materials used to form the inner door panel 36 and the outer door panel 38. Alternatively, one or both of the first member 90 and the second member 92 can be formed from high strength steel materials, such as thick sheet metal material that is thicker that medium grade sheet metal. Still further, one or both of the first member 90 and the second member 92 can be formed of aluminum, any of a variety of alloys or composite materials. In other words, the materials used to manufacture or form the first member 90 and the second member 92 are not limited to steel materials. Further, the first member 90 and the second member 92 need not be made of the same materials. For example, one of the first member 90 or the second member 92 can be made of steel and the other of the first member 90 and the second member 92 can be made of aluminum or a composite material.

The door assembly 12 can further include one or both of reinforcement beams 120 and 122 at locations below the upper edge 52 of the inner door panel 36. The reinforcement beams 120 and 122 extend from the flange 46a to the flange 48a of the inner door panel 36. Since reinforcement beams 120 and 122 are conventional reinforcement structures, further description is omitted for the sake of brevity.

The various elements of the vehicle 10, other than the door assembly 12 having the reinforcement assembly 42, are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
   an inner door panel having a forward edge, a rearward edge, a lower edge and an upper edge, the inner door panel having a first attachment area adjacent to the upper edge and the forward edge and a second attachment area adjacent to the upper edge and the rearward edge;
   an outer door panel attached to the forward edge, the rearward edge and the lower edge, the inner door panel and the outer door panel defining a hollow space therebetween, the upper edge of the inner door panel and an upper edge of the outer door panel being spaced apart from one another; and
   a reinforcement assembly having a first end, a mid-section and a second end, the first end being fixedly attached to the first attachment area of the inner door panel, the second end being fixedly attached to the second attachment area of the inner door panel with the mid-section extending along the upper edge of the outer door panel, the mid-section of the reinforcement assembly and the upper edge of the inner door panel defining a window receiving slot therebetween, wherein the reinforcement assembly includes a first member and a second member that the first member extends from the first attachment area to the second attachment area when attached to the inner door panel and the first member includes an upper flange and a lower flange, the upper flange being fixedly attached to an upper flange of the second member, and, the second member includes a plurality of downwardly extending flanges that are fixedly attached to a lower flange of the first member such that a hollow interior is defined between the first member and the second member.

2. The vehicle door assembly according to claim 1, wherein
   the inner door panel includes a stiffening member fixedly attached to the inner door panel along the upper edge, the reinforcement assembly and the stiffening member defining the window slot therebetween.

3. The vehicle door assembly according to claim 2, wherein
   the stiffening member is welded to the inner door panel.

4. The vehicle door assembly according to claim 1, wherein
   the second member and the lower flange of the first member define a plurality of drainage openings between the downwardly extending flanges.

5. The vehicle door assembly according to claim 1, wherein
   the upper flange of the first member is welded to the upper flange of the second member.

6. The vehicle door assembly according to claim 1, wherein
   the lower flange of the first member is welded to the plurality of downwardly extending flanges of the second member.

7. The vehicle door assembly according to claim 6, wherein
   the inner door panel includes a stiffening member fixedly attached to the inner door panel along the upper edge, the reinforcement assembly and the stiffening member defining the window slot therebetween.

8. The vehicle door assembly according to claim 7, wherein
   the stiffening member is welded to the inner door panel.

9. The vehicle door assembly according to claim 1, wherein
   the first member includes an offset portion that extends from a lower edge of the upper flange to an upper end of the lower flange, the offset portion and the upper flange defining an obtuse angle therebetween.

10. The vehicle door assembly according to claim 9, wherein
    the lower flange of the first member is located outboard of the upper flange of the first member.

11. The vehicle door assembly according to claim 9, wherein
    the hollow interior is defined above the offset portion of the first member.

12. The vehicle door assembly according to claim 1, further comprising
    a window regulator assembly having positioning mechanism and window tracks, the positioning mechanism being installed to the inner door panel within the hollow space, with the window tracks extending from the positioning mechanism upward through the window receiving slot to an area above the upper edge of the inner door panel.

13. The vehicle door assembly according to claim 12, wherein
the positioning mechanism is connected to window glass that is retained between the window tracks for vertical movement therebetween, the positioning mechanism being operable to selectively raise and lower the window glass.

14. A vehicle door assembly comprising:
an inner door panel having a forward edge, a rearward edge, a lower edge and an upper edge, the inner door panel having a first attachment area adjacent to the upper edge and the forward edge and a second attachment area adjacent to the upper edge and the rearward edge;
an outer door panel attached to the forward edge, the rearward edge and the lower edge, the inner door panel and the outer door panel defining a hollow space therebetween, the upper edge of the inner door panel and an upper edge of the outer door panel being spaced apart from one another, and
a reinforcement assembly having a first end, a mid-section and a second end, the first end being fixedly attached to the first attachment area of the inner door panel, the second end being fixedly attached to the second attachment area of the inner door panel with the mid-section extending along the upper edge of the outer door panel, the mid-section of the reinforcement assembly and the upper edge of the inner door panel defining a window receiving slot therebetween, the reinforcement assembly includes a first member and a second member with a hollow interior defined therebetween, the first member extending from the first attachment area to the second attachment area, wherein the first member includes an upper flange and a lower flange, the upper flange being welded to an upper flange of the second member, and, the second member including a plurality of downwardly extending flanges that are welded to a lower flange of the first member, wherein the inner door panel includes a stiffening member welded to the inner door panel along the upper edge, the reinforcement assembly and the stiffening member defining the window slot therebetween.

15. The vehicle door assembly according to claim 14, further comprising
a window regulator assembly having positioning mechanism and window tracks, the positioning mechanism being installed to the inner door panel within the hollow space, with the window tracks extending from the positioning mechanism upward through the window receiving slot to an area above the upper edge of the inner door panel.

16. The vehicle door assembly according to claim 15, wherein
the positioning mechanism is connected to window glass that is retained between the window tracks for vertical movement therebetween, the positioning mechanism being operable to selectively raise and lower the window glass.

17. A vehicle door assembly, comprising:
an inner door panel having a forward edge, a rearward edge, a lower edge and an upper edge, the inner door panel having a first attachment area adjacent to the upper edge and the forward edge and a second attachment area adjacent to the upper edge and the rearward edge;
an outer door panel attached to the forward edge, the rearward edge and the lower edge, the inner door panel and the outer door panel defining a hollow space therebetween, the upper edge of the inner door panel and an upper edge of the outer door panel being spaced apart from one another; and
a reinforcement assembly includes a first member and a second member, the first member having a first end, a mid-section and a second end, the first end being fixedly and directly attached to the first attachment area of the inner door panel, the second end being fixedly and directly attached to the second attachment area of the inner door panel with the mid-section extending along the upper edge of the outer door panel, the mid-section and the upper edge of the inner door panel defining a window receiving slot therebetween, the first member having a first overall length measured from the first attachment area to the second attachment area, the second member having a second overall length that is less than the first overall length, the second member being fixedly attached to the first member such that the second member extends along the first member from the first end to a location adjacent to and spaced apart from the second end.

18. The vehicle door assembly according to claim 17, wherein
the first member includes an upper flange and a lower flange, the upper flange being fixedly attached to an upper flange of the second member and the second member being fixedly attached to the lower flange of the first member such that a hollow interior is defined between the first member and the second member.

19. The vehicle door assembly according to claim 18, wherein
the first member includes an offset portion that extends from a lower edge of the upper flange to an upper end of the lower flange, the offset portion and the upper flange defining an obtuse angle therebetween, the lower flange of the first member being located outboard of the upper flange of the first member and the hollow interior being defined above the offset portion of the first member.

20. The vehicle door assembly according to claim 18, wherein
the second member includes a plurality of downwardly extending flanges that are fixedly attached to the lower flange of the first member.

* * * * *